United States Patent
Kaneko

(10) Patent No.: US 9,568,925 B2
(45) Date of Patent: Feb. 14, 2017

(54) FUEL CELL SYSTEM

(75) Inventor: Tomohiko Kaneko, Okazaki (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 895 days.

(21) Appl. No.: 13/823,998

(22) PCT Filed: Aug. 10, 2011

(86) PCT No.: PCT/JP2011/068242
§ 371 (c)(1),
(2), (4) Date: Mar. 15, 2013

(87) PCT Pub. No.: WO2013/021476
PCT Pub. Date: Feb. 14, 2013

(65) Prior Publication Data
US 2013/0169253 A1 Jul. 4, 2013

(51) Int. Cl.
*G05F 1/46* (2006.01)
*H01M 8/04* (2016.01)
(Continued)

(52) U.S. Cl.
CPC ............ *G05F 1/46* (2013.01); *B60L 11/1803* (2013.01); *B60L 11/1887* (2013.01); *H01M 8/04559* (2013.01); *H01M 8/04567* (2013.01); *H01M 8/04589* (2013.01); *H01M 8/04619* (2013.01); *H01M 8/04888* (2013.01);
(Continued)

(58) Field of Classification Search
CPC .. G05F 1/46; H01M 8/04947; H01M 8/04619; H01M 8/04888; H01M 8/04559; H01M 8/04567; H01M 8/04589; H01M 8/04992; H01M 16/006; H01M 2250/20; H01M 8/04919; B60L 11/1803; B60L 11/1887; Y02T 90/32; Y02T 90/34; Y02E 60/50
See application file for complete search history.

(56) References Cited

U.S. PATENT DOCUMENTS

2009/0051346 A1* 2/2009 Manabe .............. B60L 11/1887
323/363
2009/0212634 A1* 8/2009 Kojima ................. B60L 3/0023
307/77
(Continued)

FOREIGN PATENT DOCUMENTS

JP 2007159315 A 6/2007
JP 2008-178287 A 7/2008
WO 2007/066676 A1 6/2007

*Primary Examiner* — Timothy J Dole
*Assistant Examiner* — Ivan Laboy Andino
(74) *Attorney, Agent, or Firm* — Andrews Kurth Kenyon LLP

(57) ABSTRACT

In a fuel cell system which controls an operation of a converter on the basis of a duty command value including a feedforward term, the deterioration of a response of the converter at a time of a rapid increase (a rapid decrease) of a load is suppressed. There is disclosed a fuel cell system comprising a converter disposed between a fuel cell and a load device, and a controller for controlling the operation of the converter on the basis of the duty command value including the feedforward term, wherein the controller calculates the feedforward term by use of a command value of a physical amount concerning the converter in an operation range where a requested power from the load device is in excess of a predetermined threshold value.

5 Claims, 3 Drawing Sheets

(51) Int. Cl.
*B60L 11/18* (2006.01)
*H01M 16/00* (2006.01)
(52) U.S. Cl.
CPC ... *H01M 8/04947* (2013.01); *H01M 8/04992* (2013.01); *H01M 16/006* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

2010/0332063 A1* 12/2010 Saeki ................. B60L 3/00
 701/22
2011/0133744 A1* 6/2011 Ono .................. G01R 31/3662
 324/430

\* cited by examiner

FUEL CELL SYSTEM

This is a 371 national phase application of PCT/JP2011/068242 filed 10 Aug. 2011, the contents of which are incorporated herein by reference.

TECHNICAL FIELD

The present invention relates to a fuel cell system.

BACKGROUND ART

Heretofore, there has been suggested a hybrid power supply device where a fuel cell, which receives supply of a reactant gas (a fuel gas and an oxidizing gas) to generate a power, is mounted together with a secondary cell such as a storage battery. For example, in recent years, there has been suggested a hybrid power supply device including a main power source part (a fuel cell), an auxiliary power source part (a battery), and a voltage regulating part (a DC-DC converter or the like) which regulates an output voltage of the main power source part to a predetermined direct-current voltage and outputs the regulated direct-current voltage (see Patent Document 1). The voltage regulating part of such a device is configured to operate in one of a feedforward drive mode and a feedback drive mode in accordance with operation parameters of the main power source part.

PRIOR ART DOCUMENTS

Patent Documents

[Patent Document 1] Japanese Patent Application Laid-Open No. 2008-178287

SUMMARY OF THE INVENTION

Problems to be Solved by the Invention

Meanwhile, in such a conventional hybrid power supply device as disclosed in Patent Document 1, an output current, an output voltage and the like of a fuel cell are measured, and a feedforward drive mode signal is generated by using these measured values. When a feedforward signal for converter control is generated by using the measured values in this way, a response of the converter deteriorates in the case of rapid increase or rapid decrease of a load (a requested power). In consequence, there might occur the problem that a response of an output power of the fuel cell to the requested power rapidly deteriorates.

The present invention has been developed in view of such situations, and an object thereof is to suppress the deterioration of a response of a converter at a time of a rapid increase (a rapid decrease) of a load, in a fuel cell system which controls an operation of the converter on the basis of a duty command value including a feedforward term.

Means for Solving the Problems

To achieve the above object, a fuel cell system according to the present invention is a fuel cell system comprising: a converter disposed between a fuel cell and a load device; and a controller for controlling an operation of the converter on the basis of a duty command value including a feedforward term, wherein the controller calculates the feedforward term by use of a command value of a physical amount concerning the converter in an operation range where a requested power from the load device is in excess of a predetermined threshold value.

When such a configuration is employed, the feedforward term included in the duty command value of the converter can be calculated by using the command value of the physical amount concerning the converter (e.g., an input voltage command value or a current command value) in a high load range (an operation range where the requested power from the load device is in excess of the predetermined threshold value). Therefore, the response of the converter in the high load range can be enhanced, as compared with a case where the feedforward term is calculated on the basis of measured values. In consequence, a load of a feedback term included in the duty command value can be decreased, and hence stability of converter control in the high load range can be acquired. Moreover, an output power of the fuel cell can be made to quickly respond to the requested power, and hence a possibility of overdischarge of a battery can be lowered.

In the fuel cell system according to the present invention, it is possible to employ the controller for calculating the feedforward term on the basis of an inlet voltage command value of the converter and an outlet voltage command value of the converter.

For example, it is possible to employ the controller for calculating a feedforward term $D_{FF}$ in accordance with an equation "$D_{FF}=1-V_{REF\_L}/V_{REF\_H}$", in which $V_{REF\_L}$ is the inlet voltage command value of the converter, and $V_{REF\_H}$ is the outlet voltage command value of the converter. Moreover, it is also possible to employ the controller for calculating the feedforward term $D_{FF}$ in accordance with an equation "$D_{FF}=1-V_{REF\_L}/V_{MES\_H}$", in which $V_{MES\_H}$ is a measured outlet voltage value of the converter.

Furthermore, in the fuel cell system according to the present invention, it is also possible to employ the controller for calculating the inlet voltage command value of the converter on the basis of current voltage characteristics of the fuel cell and an inlet current command value of the converter. In addition, it is also possible to employ the controller for calculating the inlet voltage command value of the converter on the basis of the current voltage characteristics of the fuel cell, current power characteristics of the fuel cell, and a power command value of the fuel cell. Furthermore, it is also possible to employ the controller for calculating the inlet voltage command value of the converter on the basis of the current voltage characteristics of the fuel cell, loss characteristics of the converter, and an outlet current command value of the converter.

Moreover, in the fuel cell system according to the present invention, it is possible to employ the controller for correcting phase characteristics of the command values for use in the calculation of the feedforward term. In addition, it is also possible to employ the controller for correcting phase characteristics of the calculated feedforward term.

When such configurations are employed, the phase characteristics of the command values for use in the calculation of the feedforward term and the phase characteristics of the calculated feedforward term can be corrected, and hence the response can further be enhanced.

Moreover, in the fuel cell system according to the present invention, it is possible to employ the for calculating the feedforward term $D_{FF}$ in accordance with the following equation in an operation range where the requested power from the load device is not more than the predetermined threshold value.

$$D_{FF} = \sqrt{2Lf} \times \sqrt{\frac{V_{MES\_H} - V_{MES\_L}}{V_{MES\_H} \times V_{MES\_L}}} \times \sqrt{I_{REF}} \quad \text{[Equation 1]}$$

In this equation, L is an inductance of a reactor in the converter, f is an operation frequency of the converter, $V_{MES\_H}$ is the measured outlet voltage value of the converter, $V_{MES\_L}$ is a measured inlet voltage value of the converter, and $I_{REF}$ is the inlet current command value of the converter.

It is known that the response of the converter is noticeably different between the high load range (the operation range where the requested power from the load device is in excess of the predetermined threshold value) and a low load range (an operation range where the requested power from the load device is not more than the predetermined threshold value). When such a configuration is employed, the feedforward term can accurately be calculated in consideration of the response of the converter in the low load range.

Advantageous Effect of the Invention

According to the present invention, it is possible to suppress the deterioration of a response of a converter at a time of a rapid load increase (a rapid load decrease), in a fuel cell system which controls an operation of the converter on the basis of a duty command value including a feedforward term.

MODE FOR CARRYING OUT THE INVENTION

Hereinafter, a fuel cell system 1 according to an embodiment of the present invention will be described with reference to the drawings. The fuel cell system 1 according to the present embodiment is a power generation system mounted on a fuel cell vehicle.

Figure 1:
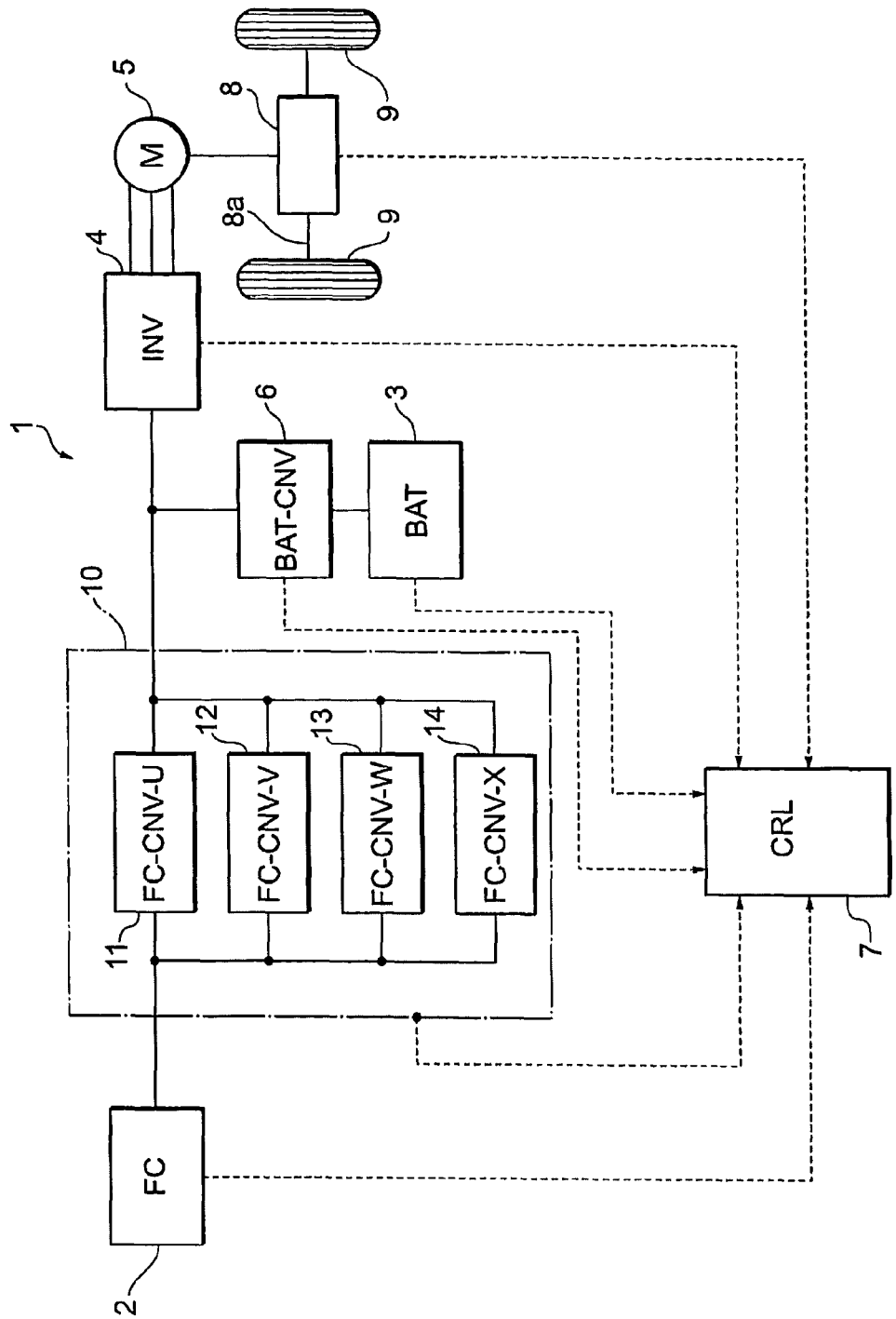
FIG. 1 is a constitutional view of a fuel cell system according to an embodiment of the present invention.

As shown in FIG. 1, the fuel cell system 1 supplies a power generated by a fuel cell 2 or a battery 3 to a traction motor 5 via an inverter 4, to rotate and drive the traction motor 5. The fuel cell system 1 includes an FC converter 10 disposed between the fuel cell 2 and the inverter 4, a battery converter 6 disposed between the battery 3 and the inverter 4, a controller 7 which integrally controls the whole system, and the like.

The fuel cell 2 is a solid polymer electrolytic cell stack in which a plurality of unit cells are stacked in series. In the fuel cell 2, an oxidizing reaction of the following formula (1) occurs in an anode pole, a reducing reaction of the following formula (2) occurs in a cathode pole, and an electromotive reaction of the following formula (3) occurs in the whole fuel cell 2.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Each of the unit cells constituting the fuel cell 2 has a structure where a membrane-electrode assembly (MEA) having a polymer electrolytic membrane sandwiched between two poles of the anode pole and the cathode pole is sandwiched between separators for supplying a fuel gas and an oxidizing gas. The fuel cell 2 is provided with a system for supplying the fuel gas to the anode poles, a system for supplying the oxidizing gas to the cathode poles, and a system for supplying a cooling liquid into the separators. An amount of the fuel gas to be supplied and an amount of the oxidizing gas to be supplied are controlled in accordance with a control signal from the controller 7, so that a desirable power can be generated.

The FC converter 10 performs a function of controlling an output voltage of the fuel cell 2. As shown in FIG. 1, the FC converter 10 in the present embodiment is a multiphase converter in which four phases of a U-phase converter 11, a V-phase converter 12, a W-phase converter 13 and an X-phase converter 14 are connected in parallel. The FC converter 10 can switch drive phases of one-phase drive to use only one phase (e.g., the U-phase), two-phases drive to use two phases (e.g., the U-phase and the V-phase), three-phases drive to use three phases (e.g., the U-phase, the V-phase, and the W-phase), and four-phases drive to use all the drive phases, in accordance with a load (a requested power) of a load device such as the traction motor 5.

The FC converter 10 controls the output voltage of the fuel cell 2 in accordance with a desired output. Additionally, an input voltage and an input current of the FC converter 10 (the output voltage and an output current of the fuel cell 2) and an output voltage and an output current of the FC converter 10 can be detected by not-shown voltage sensors and current sensors.

Examples of a type of a switching element for use in each drive phase (the U-phase, the V-phase, the W-phase or the X-phase) of the FC converter 10 include diodes such as a junction Schottky diode, a p-i-n/Schottky composite diode, and an MOS barrier Schottky diode; current controlling transistors such as a bipolar junction type transistor (BJT) and Darlington; thyristors such as a usual thyristor and a gate turn off (GTO) thyristor; and voltage controlling transistors such as an MOS field-effect transistor (FET), an insulating gate bipolar transistor (IGBT), and an injection facilitating type insulating gate transistor (IEGT). Among these types, the thyristors and the voltage controlling transistors are preferable.

The battery 3 is connected in parallel with the fuel cell 2 to the traction motor 5, and performs a function of accumulating an excessive power or regenerative energy during regenerative braking, and a function of an energy buffer during load fluctuation accompanying acceleration or deceleration of the fuel cell vehicle. As the battery 3, it is possible to employ a secondary cell such as a nickel/cadmium storage battery, a nickel/hydrogen storage battery or a lithium secondary cell.

The battery converter 6 performs a function of controlling an input voltage of the inverter 4, and it is possible to employ, for example, a battery converter having a circuit constitution similar to the FC converter 10. As the battery converter 6, a voltage raising converter may be employed, but in place of this converter, a voltage raising/lowering converter which can perform a voltage raising operation and a voltage lowering operation may be employed, and any constitution that can control the input voltage of the inverter 4 can be employed.

As the inverter 4, for example, a PWM inverter driven by a pulse width modulation system can be employed, and the inverter converts a direct-current power supplied from the fuel cell 2 or the battery 3 into a three-phases alternate-current power in accordance with a control command from the controller 7, to control a rotary torque of the traction motor 5.

The traction motor 5 generates the rotary torque which becomes the power of the fuel cell vehicle, and also generates a regenerative power during the deceleration. The rotary torque of the traction motor 5 is decelerated to a predetermined rotation number by a decelerating device 8, and then transmitted to wheels 9 via a shaft 8a. Additionally, in the present embodiment, all devices (including the traction motor 5 and the decelerating device 8) that receive the power supplied from the fuel cell 2 to operate will generically be referred to as the load devices.

The controller 7 is a computer system for integrally controlling the fuel cell system 1, and includes, for example, a CPU, an RAM, an ROM, and the like. The controller 7 receives inputs of signals supplied from various sensors (e.g., a signal indicating an accelerator pedal open degree, a signal indicating a vehicle speed, a signal indicating the output current or the output voltage of the fuel cell 2, etc.), to calculate the load (the requested power) of the load device.

The load of the load device is, for example, a total value of a vehicle running power and an auxiliary machine power. The auxiliary machine power includes a power consumed by car-mounted auxiliary machines (an air compressor, a hydrogen pump, a cooling water circulation pump, etc.), a power consumed by devices (a change gear, a wheel control device, a steering device, a suspension device, etc.) required for vehicle running, a power consumed by devices (an air conditioning device, a light fixture, an audio, etc.) arranged in a passenger space, and the like.

Moreover, the controller 7 determines a distribution of output powers of the fuel cell 2 and the battery 3, and calculates a power generation command value. On calculating requested powers to the fuel cell 2 and the battery 3, the controller 7 controls operations of the FC converter 10 and the battery converter 6 so as to obtain these requested powers. That is, the controller 7 performs a function of control means in the present invention.

Here, the function of the controller 7 of the fuel cell system 1 according to the present embodiment will be described in more detail with reference to FIG. 2 and the like.

Figure 3:
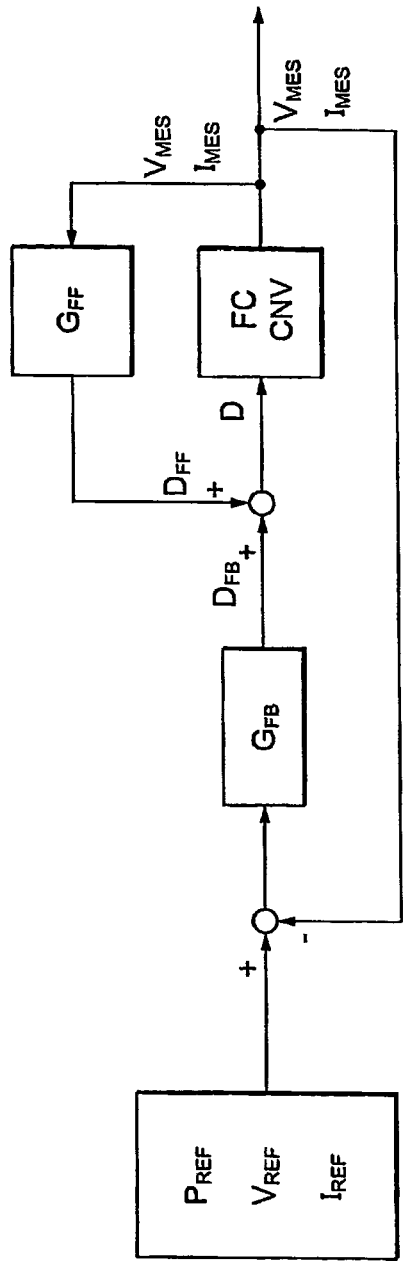
FIG. 3 is a block diagram for explaining conventional FC converter control.

As shown in FIG. 3, a conventional controller for FC converter control calculates a feedback term $D_{FB}$ included in a duty command value, on the basis of a deviation of a measured value (a measured voltage value $V_{MES}$ or a measured current value $I_{MES}$) to a command value (a voltage command value $V_{REF}$ or a current command value $I_{REF}$) of a physical amount concerning an FC converter, and calculates a feedforward term by use of the measured value (the measured voltage value $V_{MES}$ or the measured current value $I_{MES}$) of the physical amount concerning the FC converter. Then, the controller adds up the calculated feedback term $D_{FB}$ and feedforward term $D_{FB}$ to calculate a duty command value D, and controls an operation of the FC converter 10 on the basis of this duty command value D.

Figure 2:
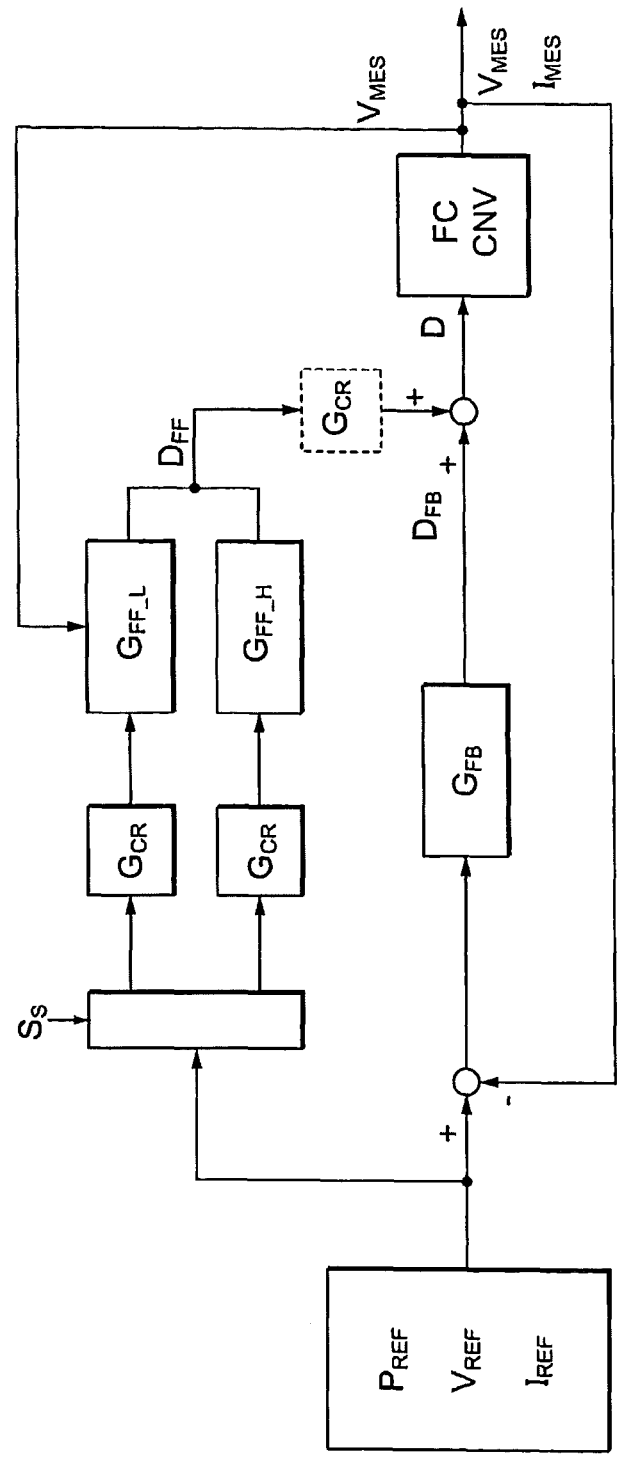
FIG. 2 is a block diagram for explaining FC converter control of the fuel cell system according to the embodiment of the present invention.

In contrast, as shown in FIG. 2, the controller 7 in the present embodiment calculates a feedforward term $D_{FF}$ included in a duty command value, by use of a command value (a voltage command value $V_{REF}$ or a current command value $I_{REF}$) of a physical amount concerning the FC converter 10. The controller 7 adds this feedforward term $D_{FF}$ to a separately calculated feedback term $D_{FB}$, to calculate a duty command value D, and controls an operation of the FC converter 10 on the basis of this duty command value D.

The controller 7 in the present embodiment switches a calculation method of the feedforward term $D_{FF}$ in accordance with the load (the requested power) of the load device. Hereinafter, the calculation method of the feedforward term $D_{FF}$ in each of a high load range and a low load range will be described.

<High Load Range>

First, the calculation method of the feedforward term $D_{FF}$ in the high load range (an operation range where the requested power is in excess of a predetermined threshold value) will be described.

When the controller 7 monitors the load (the requested power) of the load device and judges that the load is in excess of the predetermined threshold value, the controller sends a switch signal $S_S$ for calculating the feedforward term $D_{FF}$ for the high load range. Then, the controller 7 calculates the feedforward term $D_{FF}$ in accordance with an equation "$D_{FF}=1-V_{REF\_L}/V_{REF\_H}$", in which $V_{REF\_L}$ is an inlet voltage command value of the FC converter 10, and $V_{REF\_H}$ is an outlet voltage command value of the FC converter 10. It is to be noted that, in FIG. 2, a function block in which the inlet voltage command value $V_{REF\_L}$ and outlet voltage command value $V_{REF\_H}$ of the FC converter 10 are inputs and the feedforward term $D_{FF}$ is an output is represented by "$G_{FF\_H}$".

In this case, the controller 7 in the present embodiment calculates the inlet voltage command value $V_{REF\_L}$ of the FC converter 10 on the basis of current voltage characteristics (IV characteristics) of the fuel cell 2 and the inlet current command value $I_{REF}$ of the FC converter 10. Additionally, it is also possible to calculate the inlet voltage command value $V_{REF\_L}$ of the FC converter 10 on the basis of the current voltage characteristics of the fuel cell 2, current power characteristics of the fuel cell 2, and a power command value $P_{REF}$ of the fuel cell 2. Moreover, the inlet voltage command value $V_{REF\_L}$ of the FC converter 10 may be calculated on the basis of the current voltage characteristics of the fuel cell 2, loss characteristics of the FC converter 10, and an outlet current command value of the FC converter 10.

Moreover, the controller 7 in the present embodiment corrects phase characteristics of the command values (the inlet current command value $I_{REF}$, the inlet voltage command value $V_{REF\_L}$ and the outlet voltage command value $V_{REF\_H}$) for use in the calculation of the feedforward term $D_{FF}$ in the high load range, by use of a transmission function $G_{CR}$ shown by a solid line in FIG. 2. It is to be noted that, in place of the correcting of the phase characteristics of various command values, it is also possible to correct the phase characteristics of the calculated feedforward term $D_{FF}$ by use of a transmission function $G_{CR}$ shown by a broken line in FIG. 2. As the transmission function $G_{CR}$ for correcting the phase characteristics of the command values and the feedforward term, a secondary transmission function can be employed.

<Low Load Range>

Next, the calculation method of the feedforward term $D_{FF}$ in the low load range (an operation range where the requested power is not more than the predetermined threshold value) will be described.

When the controller 7 monitors the load (the requested power) of the load device and judges that the load is not more than the predetermined threshold value, the controller sends a switch signal $S_S$ for calculating the feedforward term $D_{FF}$ for the low load range. Then, the controller 7 calculates the feedforward term $D_{FF}$ in accordance with the following equation.

$$D_{FF} = \sqrt{2Lf} \times \sqrt{\frac{V_{MES\_H} - V_{MES\_L}}{V_{MES\_H} \times V_{MES\_L}}} \times \sqrt{I_{REF}} \qquad \text{[Equation 2]}$$

In this equation, L is an inductance of a reactor in the FC converter 10, f is an operation frequency of the FC converter 10, $V_{MES\_H}$ is the measured outlet voltage value of the FC converter 10, $V_{MES\_L}$ is the measured inlet voltage value of the FC converter 10, and $I_{REF}$ is the inlet current command value of the FC converter 10. It is to be noted that, in FIG. 2, a function block in which an inlet current command value $I_{REF\_L}$ of the FC converter 10 and the like are inputs and the feedforward term $D_{FF}$ is an output is represented by "$G_{FF\_L}$".

Moreover, the controller 7 corrects phase characteristics of the current command value $I_{REF}$ for use in the calculation of the feedforward term $D_{FF}$ in the low load range by use of a transmission function $G_{CR}$ shown by a solid line in FIG. 2. It is to be noted that, in place of the correcting of the phase characteristics of the current command value $I_{REF}$, it is also possible to correct the phase characteristics of the calculated feedforward term $D_{FF}$ by use of the transmission function $G_{CR}$ shown by the broken line in FIG. 2. As the transmission function $G_{CR}$ for correcting the phase characteristics of the command value and the feedforward term, a secondary transmission function can be employed.

In the fuel cell system 1 according to the above-mentioned embodiment, in the high load range, the feedforward term $D_{FF}$ included in the duty command value D for converter control can be calculated by using the command value (the voltage command value $V_{REF}$ or the current command value $I_{REF}$) of the physical amount concerning the FC converter 10. Therefore, as compared with a case where the feedforward term is calculated on the basis of the measured value, a response of the FC converter 10 in the high load range can be enhanced. In consequence, a load of the feedback term $D_{FB}$ included in the duty command value D can be decreased, and hence stability of the converter control in the high load range can be acquired. Moreover, the output power of the fuel cell 2 can be made to quickly respond to the requested power, and hence a possibility of overdischarge of the battery 3 can be lowered.

Moreover, in the fuel cell system 1 according to the above-mentioned embodiment, in the low load range, the feedforward term $D_{FF}$ is calculated by a calculation method which is different from that in the high load range. Therefore, the feedforward term $D_{FF}$ can accurately be calculated, in consideration of the response of the FC converter 10 in the low load range which is different from that in the high load range.

Furthermore, in the fuel cell system 1 according to the above-mentioned embodiment, the phase characteristics of the command value (the current command value $I_{REF}$ or the voltage command value $V_{REF}$) for use in the calculation of the feedforward term $D_{FF}$ are corrected, and hence the response can further be enhanced.

It is to be noted that in the present embodiment, there has been described an example where the feedforward term $D_{FF}$ is calculated in accordance with the equation "$D_{FF}=1-V_{REF\_L}/V_{REF\_H}$" in the high load range, but the calculation method of the feedforward term $D_{FF}$ is not limited to this method. For example, it is also possible to calculate the feedforward term $D_{FF}$ in accordance with "$D_{FF}=1-V_{REF\_L}/V_{MES\_H}$", in which $V_{MES\_H}$ is a measured outlet voltage value of the FC converter 10.

Even when the above equation is employed, the inlet voltage command value $V_{REF\_L}$ of the FC converter 10 can be calculated on the basis of the current voltage characteristics (the IV characteristic) of the fuel cell 2 and the inlet current command value $I_{REF}$ of the FC converter 10. Moreover, it is possible to calculate the inlet voltage command value $V_{REF\_L}$ of the FC converter 10 on the basis of the current voltage characteristics of the fuel cell 2, the current power characteristics of the fuel cell 2, and the power command value $P_{REF}$ of the fuel cell 2, and it is also possible to calculate the inlet voltage command value $V_{REF\_L}$ of the FC converter 10 on the basis of the current voltage characteristics of the fuel cell 2, the loss characteristics of the FC converter 10, and the outlet current command value of the FC converter 10.

Moreover, in the above embodiment, there has been described an example where the fuel cell system according to the present invention is mounted on the fuel cell vehicle, but the fuel cell system according to the present invention can be mounted on various mobile bodies (a robot, a ship, an airplane, etc.) other than the fuel cell vehicle. Furthermore, the fuel cell system according to the present invention may be applied to a stational power generation system for use as a power generation facility for a construction (a housing, a building or the like). Furthermore, it is also possible to apply the present invention to a portable fuel cell system.

DESCRIPTION OF REFERENCE NUMERALS

1 . . . fuel cell system, 2 . . . fuel cell, 5 . . . traction motor (load device), 7 . . . controller, and 10 . . . FC converter.

The invention claimed is:
1. A fuel cell system comprising:
a converter disposed between a fuel cell and a load device; and
a controller for controlling an operation of the converter on the basis of a duty command value including a feedforward term, the controller includes a computer system configured to control the fuel cell system, the computer system having a CPU, a RAM, and a ROM, the controller configured to receive input signals from a plurality of sensors located in the fuel cell system, and the controller configured to calculate equations based on the input signals,
wherein the controller calculates the feedforward term by use of a command value of a physical amount concerning the converter in an operation range where a requested power from the load device is in excess of a predetermined threshold value, and
wherein the controller calculates the feedforward term on the basis of:
an inlet voltage command value of the converter; and
an outlet voltage command value of the converter, and
wherein the controller calculates the feedforward term $D_{FF}$ in accordance with the following equation:

$$D_{FF}=1-V_{REL\_L}/V_{REF\_H},$$

in which $V_{REF\_L}$ is the inlet voltage command value of the converter, and $V_{REF\_H}$ is the outlet voltage command value of the converter.
2. The fuel cell system according to claim 1,
wherein the controller calculates the inlet voltage command value of the converter on the basis of current voltage characteristics of the fuel cell and an inlet current command value of the converter.

3. The fuel cell system according to claim 1, wherein the controller calculates the inlet voltage command value of the converter on the basis of the current voltage characteristics of the fuel cell, current power characteristics of the fuel cell, and a power command value of the fuel cell.

4. The fuel cell system according to claim 1, wherein the controller calculates the inlet voltage command value of the converter on the basis of the current voltage characteristics of the fuel cell, loss characteristics of the converter, and an outlet current command value of the converter.

5. A fuel cell system comprising:
a converter disposed between a fuel cell and a load device; and
a controller for controlling an operation of the converter on the basis of a duty command value including a feedforward term, the controller includes a computer system configured to control the fuel cell system, the computer system having a CPU, a RAM, and a ROM, the controller configured to receive input signals from a plurality of sensors located in the fuel cell system, and the controller configured to calculate equations based on the input signals,
wherein the controller calculates the feedforward term by use of a command value of a physical amount concerning the converter in an operation range where a requested power from the load device is in excess of a predetermined threshold value, and
wherein the controller calculates the feedforward term on the basis of:
an inlet voltage command value of the converter; and
an outlet voltage command value or a measured outlet voltage value of the converter, and
wherein the controller calculates the feedforward term $D_{FF}$ in accordance with the following equation in an operation range where the requested power from the load device is not more than the predetermined threshold value:

$$D_{FF} = \sqrt{2Lf} \times \sqrt{\frac{V_{MES\_H} - V_{MES\_L}}{V_{MES\_H} \times V_{MES\_L}}} \times \sqrt{I_{REF}}$$

Where L an inductance of a reactor in the converter, f is an operation frequency of the converter, $V_{MES\_H}$ is the measured outlet voltage value of the converter, $V_{MES\_L}$ is a measured inlet voltage value of the converter, and $I_{REF}$ is the inlet current command value of the converter.

* * * * *